(12) United States Patent
Graham

(10) Patent No.: US 8,741,092 B2
(45) Date of Patent: *Jun. 3, 2014

(54) PRODUCTION, FORMING, BONDING, JOINING AND REPAIR SYSTEMS FOR COMPOSITE AND METAL COMPONENTS

(75) Inventor: Neil Graham, Applecross (AU)

(73) Assignee: Quickstep Technologies Pty Ltd., Applecross (AU)

( * ) Notice: Subject to any disclaimer, the term of this patent is extended or adjusted under 35 U.S.C. 154(b) by 709 days.

This patent is subject to a terminal disclaimer.

(21) Appl. No.: 11/930,914

(22) Filed: Oct. 31, 2007

(65) Prior Publication Data
US 2009/0294053 A1  Dec. 3, 2009

Related U.S. Application Data

(62) Division of application No. 10/204,938, filed as application No. PCT/AU01/00224 on Mar. 2, 2001, now Pat. No. 7,306,692.

(30) Foreign Application Priority Data

Mar. 3, 2000 (AU) .......................... PQ6041
Sep. 5, 2000 (AU) .......................... PQ9924

(51) Int. Cl.
*B29C 65/00* (2006.01)
*B29C 65/26* (2006.01)

(52) U.S. Cl.
USPC ............... 156/285; 156/304.1; 156/304.3; 156/312; 156/94

(58) Field of Classification Search
None
See application file for complete search history.

(56) References Cited

U.S. PATENT DOCUMENTS

| | | |
|---|---|---|
| 1,806,861 A | 5/1931 | Owen |
| 1,872,692 A | 8/1932 | Drake |
| 2,519,661 A | 8/1950 | Johnson |
| 2,565,952 A | 8/1951 | Curran et al. |
| 3,161,919 A | 12/1964 | Renaud |
| 3,531,357 A | 9/1970 | Heckly |
| 3,580,795 A | 5/1971 | Eichenlaub |
| 3,891,489 A | 6/1975 | Bordner et al. |
| 3,964,958 A | 6/1976 | Johnston |
| 4,126,659 A | 11/1978 | Blad |
| 4,190,205 A | 2/1980 | Mitchell |
| 4,309,232 A | 1/1982 | McIntosh et al. |
| 4,533,591 A | 8/1985 | Sorko Ram |
| 4,842,663 A | 6/1989 | Kramer |
| 4,892,599 A | 1/1990 | Marwick |

(Continued)

FOREIGN PATENT DOCUMENTS

| AU | 697678 | 10/1998 |
|---|---|---|
| DE | 2911247 A1 | 10/1980 |

(Continued)

OTHER PUBLICATIONS

Office Action mailed Apr. 2, 2010, in U.S. Appl. No. 12/110,559.

(Continued)

*Primary Examiner* — Justin Fischer
(74) *Attorney, Agent, or Firm* — Faegre Baker Daniels LLP

(57) ABSTRACT

Method and apparatus for the production, forming bonding, joining and repair systems composite and metal components utilizing at least one pressure chamber having a displaceable abutment face, wherein fluid is circulated at an elevated temperature and pressure through the pressure chamber.

14 Claims, 10 Drawing Sheets

(56) References Cited

U.S. PATENT DOCUMENTS

| | | | |
|---|---|---|---|
| 5,154,872 | A | 10/1992 | Masui et al. |
| 5,266,137 | A | 11/1993 | Hollingsworth |
| 5,374,388 | A | 12/1994 | Frailey |
| 5,378,134 | A | 1/1995 | Blot et al. |
| 5,785,760 | A | 7/1998 | Sconyers et al. |
| 5,922,265 | A | 7/1999 | Parekh |
| 5,961,902 | A | 10/1999 | Ishitoya et al. |
| 5,971,742 | A | 10/1999 | McCollum et al. |
| 5,975,183 | A | 11/1999 | Reis et al. |
| 6,149,844 | A | 11/2000 | Graham |
| 6,160,761 | A | 12/2000 | Sansone |
| 6,485,668 | B1 | 11/2002 | Murphy et al. |
| 6,616,879 | B1 | 9/2003 | Kobayashi et al. |
| 6,835,263 | B2 | 12/2004 | Bergmann et al. |
| 7,060,217 | B2 | 6/2006 | Dunton et al. |
| 7,153,458 | B2 | 12/2006 | Ide et al. |
| 7,497,981 | B2 | 3/2009 | Graham |
| 2002/0047224 | A1 | 4/2002 | McCollum et al. |
| 2002/0093120 | A1 | 7/2002 | Magni et al. |
| 2004/0113315 | A1 | 6/2004 | Graham |
| 2005/0074597 | A1 | 4/2005 | Grinberg et al. |
| 2012/0135219 | A1 | 5/2012 | Graham |
| 2013/0306220 | A1 | 11/2013 | Graham |

FOREIGN PATENT DOCUMENTS

| | | | |
|---|---|---|---|
| DE | 4441227 | A1 | 5/1996 |
| DE | 20116817 | U1 | 1/2002 |
| EP | 0 255 596 | | 11/1990 |
| EP | 0491650 | B1 | 5/1995 |
| EP | 0 858 977 | | 8/1998 |
| EP | 1 000 731 | | 5/2000 |
| EP | 1 008 436 | | 6/2000 |
| EP | 1238785 | B1 | 4/2004 |
| FR | 2.080.567 | | 11/1971 |
| FR | 2080567 | | 11/1971 |
| FR | 2634682 | * | 2/1990 |
| FR | 2 705 914 | | 12/1994 |
| FR | 2790219 | A1 | 9/2000 |
| FR | 2822749 | A1 | 10/2002 |
| JP | 2020338 | | 1/1990 |
| JP | 02020338 | | 1/1990 |
| JP | 3-009815 | A | 1/1991 |
| JP | 09177014 | * | 7/1997 |
| JP | 10034751 | | 2/1998 |
| JP | 11-208603 | * | 8/1999 |
| JP | 11-268067 | A | 10/1999 |
| JP | 2004-174929 | A | 6/2004 |
| SU | 617130 | | 7/1978 |
| WO | WO96/07532 | A1 | 3/1996 |
| WO | 98/53982 | | 12/1998 |
| WO | WO00/46015 | A1 | 8/2000 |
| WO | WO02/058916 | A1 | 8/2002 |

OTHER PUBLICATIONS

Office Action mailed May 12, 2010, in U.S. Appl. No. 11/994,062.
Office Action mailed May 27, 2010, in U.S. Appl. No. 11/931,016.
Final Office Action mailed Nov. 21, 2011, in U.S. Appl. No. 12/110,559.
Office Action mailed Dec. 20, 2012, in U.S. Appl. No. 12/110,559.
Office Action mailed Dec. 31, 2012, in U.S. Appl. No. 11/931,016.
Partial European Search Report dated Aug. 8, 2011 in corresponding EP Application No. 11170594.3.
Office Action dated Jun. 15, 2011 in U.S. Appl. No. 12/110,559.
Office Action dated Sep. 20, 2010 in U.S. Appl. No. 12/110,559.
Office Action dated Dec. 2, 2010 in U.S. Appl. No. 11/931,016.
Office Action dated Oct. 27, 2010 in U.S. Appl. No. 11/994,062.
Office Action dated Jul. 13, 2007 in U.S. Appl. No. 10/466,288.
Office Action dated Apr. 4, 2008 in U.S. Appl. No. 10/466,288.
European Search Report dated Jan. 14, 2011 in European Application No. 10170711.5.

* cited by examiner

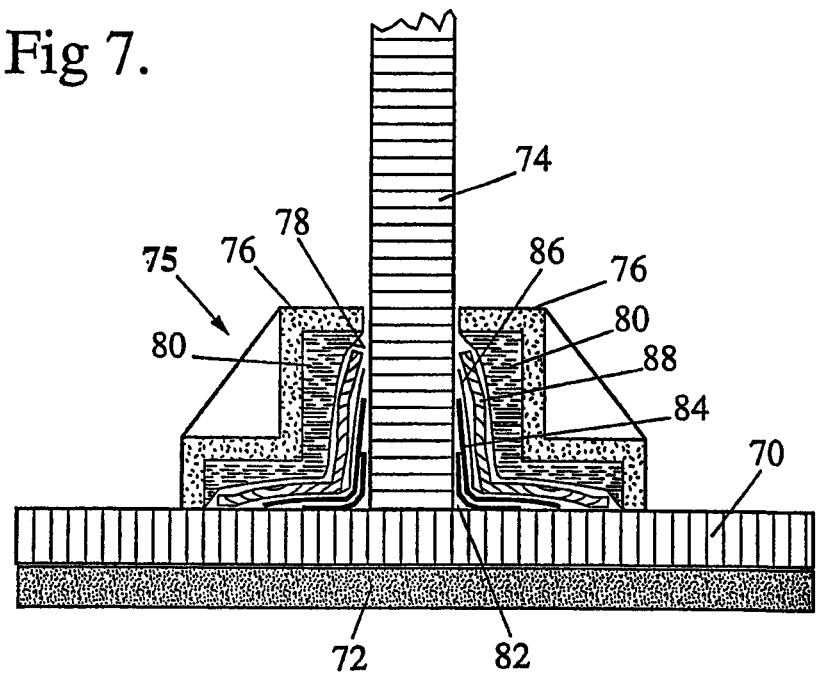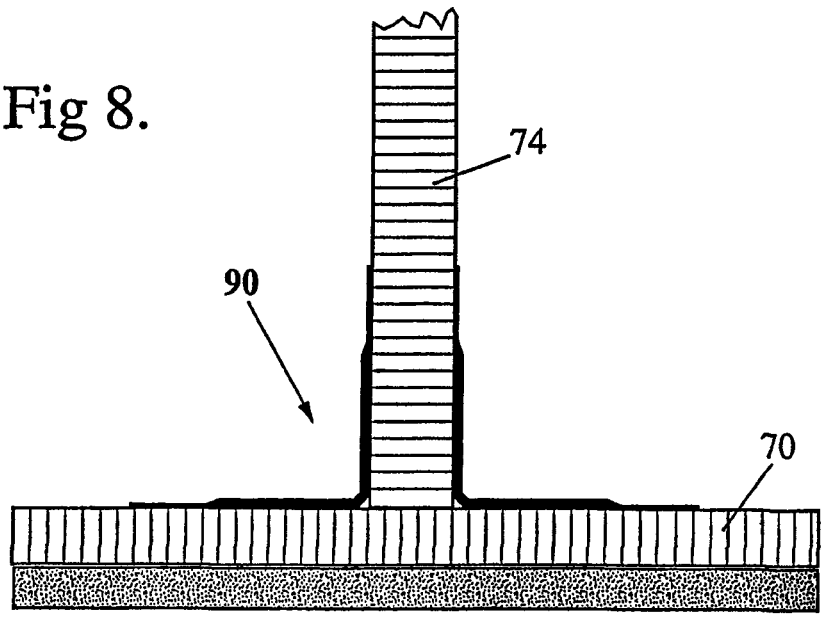

PRODUCTION, FORMING, BONDING, JOINING AND REPAIR SYSTEMS FOR COMPOSITE AND METAL COMPONENTS

CROSS-REFERENCE TO RELATED APPLICATIONS

This application is a division of U.S. patent application Ser. No. 10/204,938, entitled PRODUCTION, FORMING, BONDING, JOINING AND REPAIR SYSTEMS FOR COMPOSITE AND METAL COMPONENTS, filed on Sep. 19, 2002, now U.S. Pat. No. 7,306,692 assigned to the assignee of the present application, the disclosure of which is expressly incorporated hereby by reference; U.S. application Ser. No. 10/204,938 is related to and claims the benefit under 35 U.S.C. §119 and 35 U.S.C. §365 of International Application No. PCT/AU01/00224, filed Mar. 2, 2001.

BACKGROUND OF THE INVENTION

The present invention generally relates to production and repair systems for components made from material such as metal and composites. Although the present invention is applicable for use in the aeronautical industry, and the invention will be described with respect to this application, it is however to be appreciated that the present invention also has general industrial application.

Modern aircraft airframes can be constructed from a variety of different materials. Commonly used material include aluminium and other metals, although composite materials are also now being used to produce various aircraft components.

The high precision nature of airframe and aircraft component production require the use of specialised production methods. Furthermore, specialised equipment is required to repair such airframes or components. The present invention relates to a system for repairing, joining and producing composite and metal components. Although the present invention will be described in relation to its use in the aeronautical industry, the invention is also applicable for other applications.

The term "composite" is commonly used in industry to identify components produced by impregnating a fibrous material with a thermoplastic or thermocuring resin to form laminates or layers.

Composites are widely used in the aerospace industry to provide aircraft components such as fuselages, wings and tail fins, doors and so on. This is because composite components have the physical attribute of being relatively lightweight while at the same time having high structural strength in comparison to metals. Such composite components typically are of a sandwich construction having a honeycomb core covered by an outer and inner skin.

It is possible to repair holes passing at least partially and totally through such composite components. The general approach is to remove the damaged part from the aircraft, and repair the hole by using an electric blanket with a vacuum bag. A "prepreg" formed of a layer of fibrous material impregnated with uncured resin is laid over the area to be repaired. The electric blanket applies heat to that area to cure the prepreg. The vacuum bag holds the electric blanket in position over the repair area while at the same time applying a compaction force to the prepreg.

Repairs using this approach are not however always satisfactory. This is because the inconsistency of the heat provided by the electric blanket leads to unreliability in the curing. Also, the use of vacuum bag compaction is not very effective in removing air from the prepreg so that the repaired area is not necessarily void free.

The current approach in manufacturing composite components is by the use of autoclaves for curing. This limits the maximum size of the composite components that can be produced by this approach to the maximum practical size of an autoclave. Therefore, although it is possible to use composite components in the production of the fuselage of aircraft such as military jet fighters, it has until now been practically too difficult to manufacture the fuselage of larger aircraft such as commercial transport passenger aircraft using composite components because of the size restriction and cost of large autoclaves. The fuselage would need to be made up of a number of separate fuselage sections that would subsequently need to be joined. The composite components produced using the autoclave method are furthermore fully cured. This leads to poor secondary bonding performance if two such fully cured components are subsequently joined. Such secondary bonding is not as strong as a bond where the join area and the parts are fully cured at the same time. Composites joined in this way tend to delaminate at the secondary bond and thereby fall apart.

The autoclave method is also used when producing components made from metal where various metal sections or parts need to be bonded using adhesives. Again, the size of the metal component that can be produced using this method is limited by the size of the autoclave. Also, there is also a risk of distortion being produced in the joined metal component because of the need to heat and cool the entire component.

It would be advantageous to be able to provide an improved system for repairing aircraft components made from composite, metal or other materials.

It would also be advantageous to be able to produce through bonding and forming aircraft components made from composite, metal or other materials without the need for autoclaving in the production process.

It is therefore a first object of the present invention to provide an improved method and apparatus for repairing a composite component.

With this in mind, according to one aspect of the present invention, there is provided a method of repairing a composite component having a damaged area including:

laying a composite lay-up over the damaged area;

locating at least one pressure chamber over the damaged area, the pressure chamber including a displaceable abutment face;

circulating fluid at an elevated temperature and pressure through the pressure chamber to thereby compress the lay-up between the abutment face of the pressure chamber and the composite and elevate the temperature thereof to effect curing of the lay-up.

The composite lay-up may be a standard laminate comprising layers of fibrous material to which curing resin is applied. Alternatively, the composite lay-up may be a prepreg that has been preimpregnated with curing resin.

The abutment face may be provided by a resiliently deformable membrane formed of a resiliently deformable sheet material. For example, rubber such as silicone or equivalent high temperature rubbers or plastics could be utilised.

The advantage of having a pressure chamber using a resiliently deformable membrane, is that it takes into account variations in the thickness of the composite lay-up while at the same time providing a uniform pressure throughout the lay-up. This promotes the expulsion of air from the lay-up and the expulsion of excess resin. The resultant repaired area may therefore have little to no air bubbles providing an improved repair.

The use of circulating fluid such as water or oils to act as the heating mechanism provides for more even heat transfer to the lay-up. A rapid heat transfer may occur through the abutment face of the pressure chamber. Furthermore, the circulation of the heated fluid allows for a more even temperature to all areas of the composite lay-up, with both the thinner and thicker areas of the lay-up being heated at the same general temperature and heat energy.

Alternatively, the abutment face could be provided by a rigid mould face supported in floating relation to the rest of the pressure chamber. For example, the mould face may be supported by a peripheral resiliently deformable or flexible flange interconnecting the mould face to the rest of the pressure chamber.

The method preferably further includes cyclically varying the pressure within the pressure chamber. This results in vibratory pressure waves being applied to the abutment face which places the composite lay-up in a vibratory environment and acts to further facilitate the removal of air from the lay-up. The result is a repaired area having a relatively uniform resin to fibre ratio with little to no air bubbles in the cured composite lay-up.

In the case where the abutment face is a resiliently deformable membrane, a "caul" plate or to be even more accurate on the surface contour a separate mould may be positioned between the abutment face of the pressure chamber and the lay-up. During the repair procedure, the composite lay-up may be sandwiched between the caul plate and the composite component. This caul plate or mould may be shaped to provide a surface conforming with the shape of the surface of the composite component once repaired. Such a caul plate can be used when it is necessary to ensure aerodynamic smoothness of that component. Where vibrating pressure waves are utilised, the pressure waves may help to compact the lay-up and consolidate the lay-up into the shape of the caul plate when in position over the lay-up.

The use of an abutment face having a floating rigid mould face also works in the same manner as the caul plate, with the mould face providing the surface to shape the composite component.

The above-noted method may be used both when the composite component has been dented and when the composite component has been punctured completely therethrough. In the later case however, an initial patch may need to be provided on the side of the puncture opposite to the side to be repaired. This prevents the loss of resin and so on from the damaged area as the composite component is being repaired. Therefore, once the patch is applied to the opposite side of the puncture, the method according to the present invention can be used to repair the damaged area of the composite component. Alternatively, the patch may be applied at the same time as the composite lay-up.

A number of different repair sequences can therefore be used:
place an initial patch on one side of the damaged area, and repair the opposing side of the damaged area using the method and apparatus according to the present invention;
repair each side of the damaged area using the method and apparatus according to the present invention; or
simultaneously repair both sides of the damaged area using the method and apparatus according to the present invention.

The most preferred repair method is to place the mould or caul plate on the outside skin of the composite part and compact the part from its rear face so that any imperfections in thickness are reflected on the rear face.

It may also be preferable to provide a second pressure source for balancing the pressure applied to the damaged area to be repaired. A second pressure vessel may be placed on the opposite side of the damaged area of the composite component and opposite the first pressure chamber, with the damaged area being located between the first and second pressure chambers. The second pressure chamber may also have a displaceable abutment face. The abutment face of the second pressure chamber may be a resiliently deformable membrane. Alternatively, the abutment face may have a floating relatively rigid face shaped to conform with the shape of the composite part being repaired.

During the repair of the composite component, the second pressure chamber may apply an equal and opposite force on the composite component relative to the force applied by the first pressure chamber, as the first and second chambers may be on opposing sides of the damaged area of the composite.

Although the pressure chamber structure needs to be of high strength construction and leak proof the use of a balancing pressure allows the opposing abutment faces of the pressure chambers to cope with high forces and pressures while at the same time being of relatively light construction. The abutment faces can therefore be heated and cooled quickly with reduced use of and loss of heat energy. The total heat energy to carry out the curing, and the curing time can therefore be minimised.

The second pressure chamber can of course also act to cure a composite lay-up providing the patch for the damaged area on the opposing surface of the composite component.

It should however be noted that the provision of the balancing pressure is not critical to the present invention, and the method may still operate without this balancing force as the pressure and thus force applied to the composite component by the pressure chamber can be relatively low.

It should also be appreciated that a similar method could also be used to repair a metal component using a metal patch in place of a composite lay-up.

Therefore, according to another aspect of the present invention, there is provided a method of repairing a metal component having a damaged area including laying a metal patch with adhesive material over the damaged area;
locating at least one pressure chamber over the damaged area, the pressure chamber including a displaceable abutment face; circulating fluid at an elevated temperature and pressure through the pressure chamber to thereby compress and form the metal patch between the abutment face of the pressure chamber and the metal component and elevate the temperature thereof to effect compression, forming, and bonding of the metal patch. The provision of a vacuum about the component being repaired during the process may also be useful.

The advantages of using this repair method for metal components are the same as when the repair method is used on composite components. In particular, the use of circulating fluid at an elevated temperature and pressure through the pressure chamber helps to ensure a relatively uniform pressure on the metal patch and a relatively uniform distribution of the temperature across the patch. This may be facilitated by the abutment face of the pressure chamber being provided by a resiliently deformable membrane.

Furthermore, the pressure may be cyclically variant within the pressure chamber. This helps to remove air bubbles from the adhesive material between the metal patch and the metal component such that air voids in the resultant bond are minimised.

Furthermore, as with the repair of composite components, it may be possible to use a caul plate, the metal patch being sandwiched between the caul plate and the metal component. It is however preferred that the surface of the metal component over which the metal patch is to be applied is dimpled or indented to the depth of the metal patch if a caul plate is used in the repair. This helps to ensure a smoother finish to the repaired area.

According to a further aspect of the present invention, there is provided an apparatus for repairing a damaged area on a component including:

at least one pressure chamber having a displaceable abutment face;

fluid circulation means for circulating fluid at an elevated temperature and pressure through said at least one pressure chamber;

location means for locating the at least one pressure chamber over the damaged area with the abutment face of the pressure chamber located adjacent the damaged area.

The pressure chamber may include a housing, with the displaceable abutment face being provided on a side of the housing. The displaceable abutment face may be a resiliently deformable membrane, or may be provided by a floating rigid mould face as previously described. The housing may be shaped to generally conform with the shape of the composite or metal component to be repaired. For example, the housing may be generally arcuate in shape when seen in cross-section to correspond with the general shape of a curved face of a fuselage panel.

Alternatively, the housing may be "U" shaped in cross-section to allow for the repair of the edge of a wing or tail fin. Other shapes are also envisaged. It should be noted that the housing does not need to precisely follow the shape of the composite or metal component, because the abutment face should have enough "give" to fit the shape of the component.

Alternatively, the pressure chamber housing may be hinged in one or more points to allow the housing to be adjusted to conform more closely to the composite or metal component.

In the above arrangements, the resiliently deformable membrane may be directly secured to the housing to form the pressure chamber. It however is alternatively envisaged that the resiliently deformable face be provided by an internal flexible inflating bag supported by the housing.

The fluid circulation means may include a fluid pump for circulating fluid through fluid supply lines to and from the pressure chamber, and at least one fluid reservoir for containing fluid to be circulated.

The fluid may be pressurised by compressed gas supplied to the fluid reservoir. A compressed gas source may communicate through a gas line with the fluid reservoir. A series of fluid reservoirs may be provided, each containing fluid at different temperatures. This allows for a rapid change in the temperature of the fluid circulated through the pressure chamber as fluid can be sourced from different fluid reservoirs depending on the required temperature for the fluid. Greater control of the curing process can therefore be achieved to rapidly heat the composite to cure temperature then to rapidly cool the repaired and the surrounding laminate without leaving hot spots and thus no distortion Alternatively one fluid source with a heater to heat the fluid and a heat exchanger to cool the fluid as the cycle is completed could be employed.

The apparatus may further include vibration or impacting means to cyclically vary the pressure within the or each pressure chamber. According to the one possible arrangement, the pressure chamber may include a sonic or ultrasonic vibrator secured thereto to vibrate the pressure chamber and thereby place the composite lay-up in a vibrating environment. Alternatively, vibration may be achieved by an interrupter valve used to periodically interrupt the flow of fluid through the pressure chamber thereby creating a pressure wave effect commonly known as a "water hammer". An alternative way of achieving the pressure effect is by means of a cyclic impacting device. This can for example include a "jackhammer" or "rivet gun" type device applying a cyclic impact force on the rigid mould itself or a plate suspended within the fluid of the pressure chamber or mounted on the structure of the pressure chamber. Other means for producing cyclic variations or pressure wave effects in the pressure within the pressure chamber are also envisaged.

The apparatus may include two said pressure chambers which may be provided to allow for balanced pressures to be applied to the damaged area. The location means may therefore respectively locate the pressure chambers on opposing sides of the damaged area.

The apparatus can be used in situ on an aircraft without the need to separate the component to be repaired from the aircraft. Location means can therefore be selected for this purpose. For example, vacuum pads may be used to locate the pressure chamber over the damaged area. In addition vacuum can be employed on the patch itself to hold the apparatus in position, compact the patch and further assist in air removal from the repair.

Alternatively, lines may tie the pressure chamber onto the section of the aircraft to be repaired. It is also envisaged that a separate free standing structure be provided to support the apparatus.

The advantage of the in-situ repair is that the composite or metal components can be repaired on the aircraft on the tarmac without the removal and consequent loss of time required to repair it off the aircraft.

The repair method according to the present invention can also be readily adapted for the production of composite component parts.

Therefore, a second object of the present invention is to provide an improved method and apparatus for joining composite components.

With this in mind, according to yet another aspect of the present invention, there is provided a method of joining composite components including:

locating two separate composite components in adjacent relation, to thereby provide a join area therebetween;

applying a joining material including at least curing resin to the join area:

locating at least one pressure chamber over the join area, the pressure chamber including a displaceable abutment face;

circulating fluid at an elevated temperature and pressure through the pressure chamber to thereby compress the join area with the displaceable abutment face of the pressure chamber and elevate the temperature thereof to effect curing of the join area.

The composite components may include edges located in an adjacent relation to provide the join area therebetween. The two composite components once joined may then form a single continuous panel.

Alternatively, the edge of one said composite component may be located adjacent a face of another said component, for example a right angle joint. The corner areas defined by the two composite components may then be the join area. The composite component extending from the face of the other component could for example be a support rib on an internal panel of an airframe or component part.

The joining material may be a laminate or prepreg that is uncured and can be melted or cured into position across the join area. Other joining materials could however be used. For example, thermoplastic sheets may be forced by the pressure and melted by the heat into position in the join area. Alternatively, a resin transfer mould approach may be used, with resin being drawn into the join area under vacuum to wet and join the components. It is also envisaged that a resin injection moulding approach be used where dry fibre is used to hold the load and the resin is pumped in under pressure to wet the join area.

The displaceable abutment face of the pressure chamber may be provided by a rigid mould face supported in floating relation to the rest of the pressure chamber. For example, a resiliently deformable flange may interconnect the rigid mould face to the rest of the pressure chamber. The rigid mould face may provide an accurate profile to shape the surface of the composite lay-up.

The mould face has a surface which acts to form the surface of the join area. For example, where the composite components are being joined to form a continuous panel, the mould face may ensure that the join area has the same aerodynamically smooth surface as the rest of the surface of each composite component part.

It is however also possible for the pressure chamber to have a resiliently deformable membrane for applying pressure to the join area. A caul plate or separately positioned and accurately aligned mould can be used between the membrane and the join area if an accurate shape and smoothness is required for the join area.

The problem of secondary bonds can be overcome if the edges of the composite components for producing a continuous panel are left uncured or only partially cured. This is not readily possible when autoclaves are used to manufacture the composite components because the curing rate and temperature of cure cannot be readily controlled over the entire component.

If an autoclave is used to effect a "co-cured" bond, then the parts must be located in the correct position by using a jig and/or other fixtures. This jig together with the parts must be transportable to allow it to be moved into the autoclave. This means that there is a possibility of subsequent misalignment and distortion of the parts being held by the jig. By comparison, in the present invention, the jig and/or fixtures can be permanently fixed to a solid surface such as a concrete floor as it is not necessary for the jig to be moved. The parts can therefore be located in precise alignment without the need for any subsequent movement of the jig. This leads to finer manufacturing tolerances being achievable.

In the Applicant's Australian Patent No. 697678, details of which are incorporated herein by reference, there is described a method of manufacturing composite components which can allow for variation in the curing rate of the component. This can be achieved in the described method by controlling the temperature and circulation flow of the fluid being used to cure the component. It is then therefore possible to fully cure the component except for the edges which are allowed to remain uncured or only partially cured. When composite components manufactured in this way are joined accordingly to the present invention, the resultant join area is not a secondary bond. This is because the edges of each component being joined are fully cured at the same time as the joining material resulting in a full mechanical and chemical bond.

A balancing pressure may also be provided on the opposing side of the join area by a second pressure chamber. The second pressure chamber may include an abutment face in the form of a resiliently deformable membrane for engaging the join area.

The provision of pressure chambers on either side of the join area applying opposing and balanced forces thereon will facilitate minimal distortion of the join area.

When the or each pressure chamber is located on the join area, fluid at an elevated pressure and temperature may be circulated therethrough in the same manner as described above for the repair method and apparatus. Similarly, the pressure may also be cyclically varied to provide a vibratory pressure wave to the abutment face and subsequently to the join area.

It is also possible to achieve differential heating or cooling of the part being manufactured. This may be achieved by means of supplementary fluid chambers provided, for example by separate fluid bags, bladders or tubes located adjacent to or integral with the abutment face. Fluid may be circulated through the supplementary fluid chamber(s) at a different temperature to the pressure chamber. Areas of the part adjacent the supplementary fluid chamber can therefore be cured at a different rate relative to the rest of the part. This may be used in allowing the edges of the part to remain uncured or partially cured. It also allows for specific areas within the body of the part to be partially cured to allow for subsequent bonding of the components to that area.

The above described method may also be applicable for the bonding together of separate metal components.

Therefore, according to a further aspect of the present invention, there is provided a method of bonding metal components including:

locating two separate metal components in adjacent relation, to thereby provide a bond area therebetween;

applying a bonding material including at least one metal section and adhesive to the bond area;

locating at least one pressure chamber over the bond area, the pressure chamber including a displaceable abutment face;

circulating fluid at an elevated temperature and pressure through the pressure chamber to thereby compress the bond area with the displaceable abutment face of the pressure chamber and elevate the temperature thereof to effect bonding at the bond area.

Where the two metal components are being bonded into a single continuing panel, then the metal section may be an elongate metal strip section. However, where the edge of one metal component being bonded to and at an angle to the face of another component, then two metal angle sections may be provided, one located at each corner defined between the two components.

Accordingly to yet another aspect of the present invention, there is provided an apparatus for joining components including:

at least one pressure chamber having a displaceable abutment face;

location means for locating the pressure chamber over a join area provided by locating two separate components in adjacent relation; and fluid circulation means for circulating fluid at an elevated pressure and temperature through the at least one pressure chamber for compressing and effecting curing or bonding of the join area.

The apparatus may further include a said pressure chamber, the location means locating the further pressure chamber on the opposing side of the join area for providing a balancing pressure for the other said pressure chamber.

The abutment face of one of the pressure chambers may be in the form of a floating rigid mould face, whereas the abutment face of the other pressure chamber may be resiliently deformable.

The fluid circulation means may be similar to that of the repair apparatus previously described. Furthermore, vibration or impacting means may be included for cyclically varying the pressure or producing a pressure wave effect within the pressure chamber as in the repair apparatus.

The pressure chamber may include an elongate straight housing with the abutment face provided on one side thereof. Such a pressure chamber is used for straight join areas between adjacent components.

The pressure chamber could alternatively have an annular housing with the abutment face provided on the inner or outer periphery thereof. Such a pressure chamber can be used for joining fuselage sections for aircraft or hull sections of boats, submarines, or other large structures.

The joining method and apparatus according to the present invention can be used to join together sections of an entire fuselage of an aircraft formed of a number of separate composite or metal panels. The proposed invention is of course also applicable for producing other large structures from composite or metal components that cannot be readily constructed in one piece.

The present invention may also be adapted for bonding metal sections such as "top hat" and "T" sections to metal panels and the sections that a person skilled in the art would be familiar with. Top hat sections are used to support and reinforce metal panels of an airframe and are normally secured to the metal panel using rivets. Elaborate jigs are required to hold the panel and top hat sections in position prior to securing. Alternatively, the top hat sections are bonded to the metal panel using adhesive within an autoclave. It has however been found that the top hat sections tend to "flatten" somewhat due to the high pressures applied to them within the autoclave.

It is therefore another object of the present invention to provide an improved method and apparatus for bonding a top hat and other, sections to a metal panel.

With this in mind according to a further aspect of the present invention, there is provided a method of bonding a section to a metal panel, the section having a centre portion and opposing side flange portions, the method including locating the section adjacent the metal panel with the flange portion thereof immediately adjacent the metal panel, with adhesive material being applied between the metal panel and the flange portions, locating a respective pressure chamber over each said flange portion, each pressure chamber including a displaceable abutment face;

circulating fluid at an elevated temperature and pressure through each pressure chamber to thereby compress the flange portions with the displaceable abutment faces of the respective pressure chamber and elevate the temperature thereof to effect bonding of the flange portions to the metal panel.

The temperature and pressure within each pressure chamber may be the same. This minimises the possibility of distortion to the section. Pressure vibration may also be provided by the pressure chambers as described previously.

The opposing side of the metal panel may rest on a support jig. Alternatively, the opposing side of the metal panel may be supported on a floating mould similar to that shown in Australian Patent 697678.

An opposing pressure balancing the pressure may be applied to the flange portions by the jig or floating mould. More particularly, the balancing pressure may be provided by another pair of pressure chambers similar to that applying pressure to the flange portions. It is also possible for the opposing pressure chambers to apply a pressure directly to the opposing face of the metal without the need of an intermediate jig or floating mould.

The section may be a top hat section having a centre channel portion or other section that a person skilled in the art would be familiar with. Alternatively, the section may be a "T" section having a central web portion.

According to yet another aspect of the present invention, there is provided an apparatus for bonding a section to a metal panel, the section having a centre portion and opposing side flange portions, the apparatus including;

a pair of elongate pressure chambers located in a spaced apart parallel relation, each pressure chamber having a displaceable abutment face;

the central section of the section being locatable between the pressure chambers, with the abutment face of each pressure chamber being respectively locatable over a said flange portion of the section, and fluid circulation means for circulating fluid at an elevated pressure and temperature through each pressure chamber for compressing and effecting bonding of the flange portions to the metal panel.

The apparatus may be formed of a rigid elongate housing having a central channel sized to accommodate therein the central portion of the section, and opposing side channels providing the walls of the two pressure chambers. The abutment face of each pressure chamber may be provided by a resiliently deformable membrane.

The fluid circulation means may communicate at the same time with both pressure chambers so that the fluid temperature and pressure in each pressure chamber may be the same.

The housing may be flat or may be curved depending on the intended shape of the metal panel and cooperating section.

A pair of opposing apparatus according to the present invention may be provided, the metal panel and sections being locatable between the two apparatus during the bonding process. The two apparatus may have a cooperating curve so that the panel may be held therebetween in a curved manner to correspond to the final profile of the metal panel. The apparatus can therefore act as a jig for the panel.

The present invention is also applicable for the production of metal composites such as honeycomb metal panels or metal panels formed from bonded layers of metal.

Therefore, according to a further aspect of the present invention, there is provided a method of producing a metal composite component including;

locating metal composite material together with adhesive material therebetween between opposing pressure chambers, each pressure chamber having a displaceable abutment face;

circulating fluid at an elevated temperature and pressure through each pressure chamber to thereby bend, form, and compress the metal composite material between the opposing abutment faces and elevate the temperature of the metal composite material to effect bonding of the adhesive material to the metal.

An air breather cloth may be located between each abutment face and the composite material to facilitate the release of air therebetween.

One abutment face may be in the form of a floating pressure plate which may be flat or may be provided with a curved on profiled surface. Alternatively, the abutment face may be provided by a floating mould. The opposing abutment face may be provided by a resiliently deformable membrane.

The method may further include applying cyclic pressure variations within each pressure chamber to help form/bend the metal composite to the desired profile of configuration.

The metal composite may for example include a central metal honeycomb core, with metal skins being provided on opposing faces thereof. An adhesive material may be provided between each metal skin and the central honeycomb cone. Each metal skin may include a plurality of bleeder holes for allowing excess adhesive and air to be released from the composite.

Alternatively, the metal composite may include a plurality of metal sheet layers between which is provided sheets of adhesive material, the method bonding and forming the metal sheets into the desired profile. The metal sheets may include perforations to allow the release of air and adhesive material. Vacuum may assist in the consolidation of the stacked material however this is not necessary for the process to operate.

It will be convenient to further describe the invention with reference to the accompanying drawings which illustrate preferred embodiments of the present invention. Other embodiments are possible, and consequently the particularity of the accompanying drawings is not to be understood as superceding the generality of the preceding description of the invention.

IN THE DRAWINGS

Figure 6A:
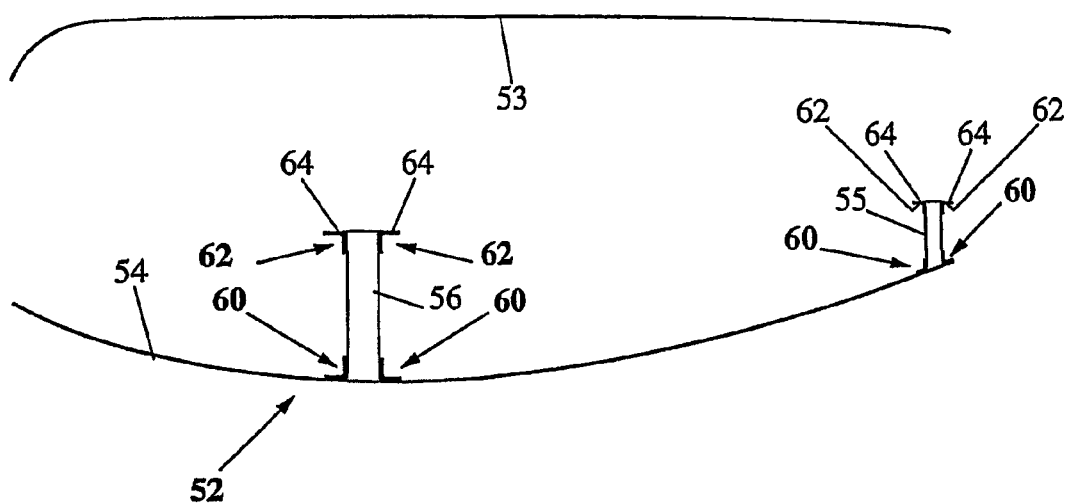
Figure 6B:
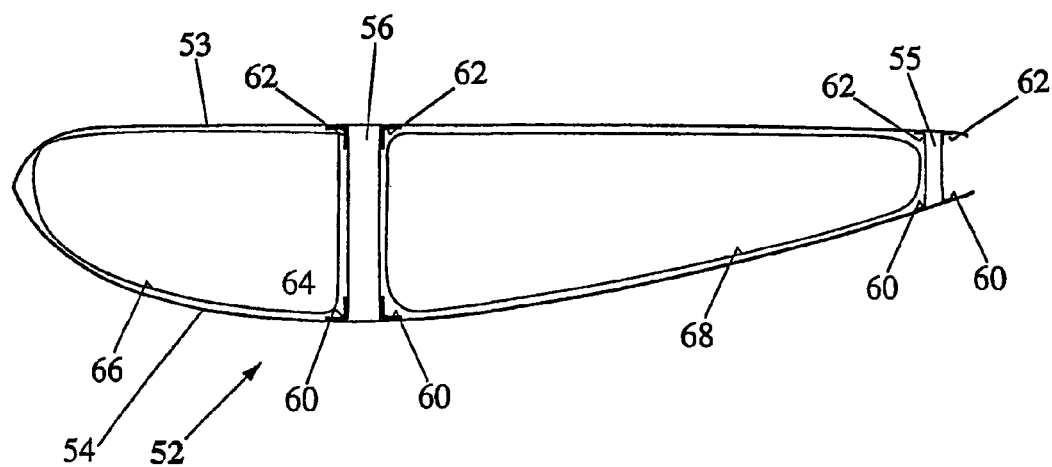
Figure 9:
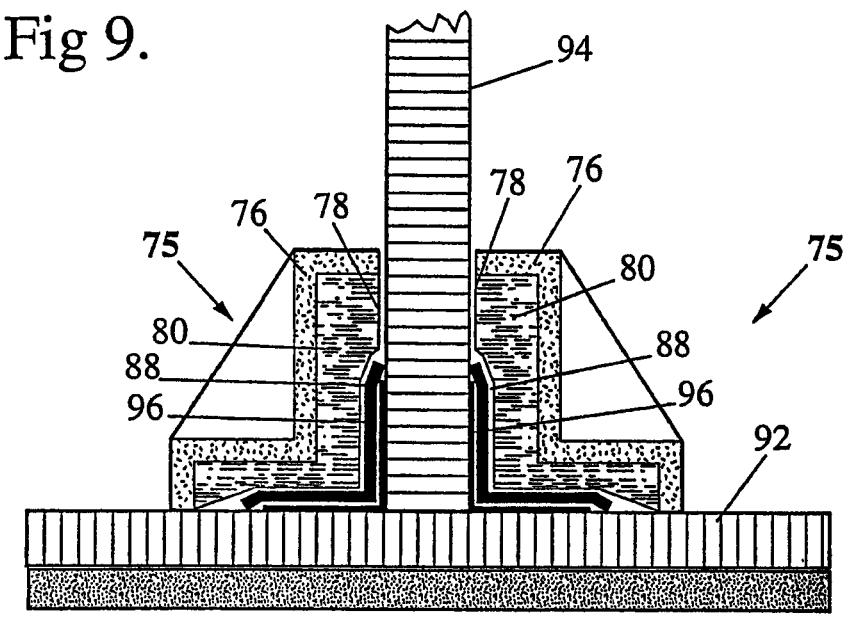
Figure 10:
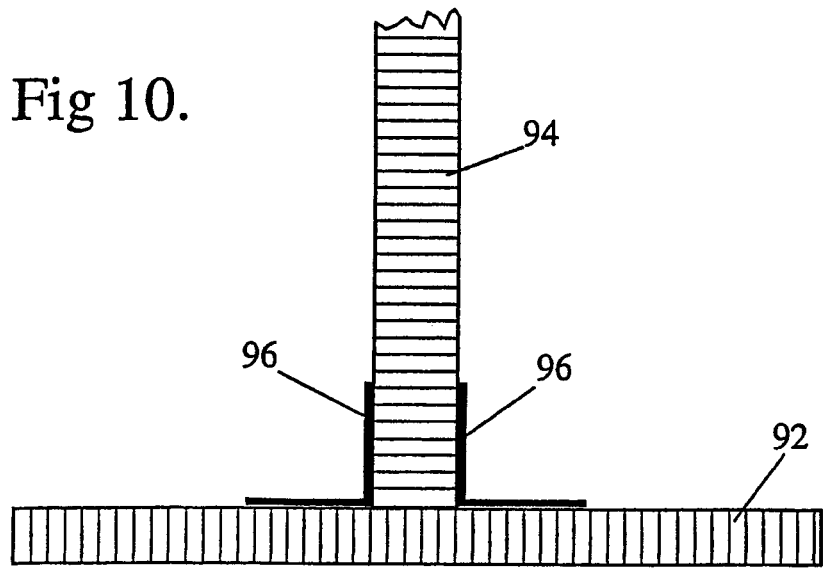
Figure 11:
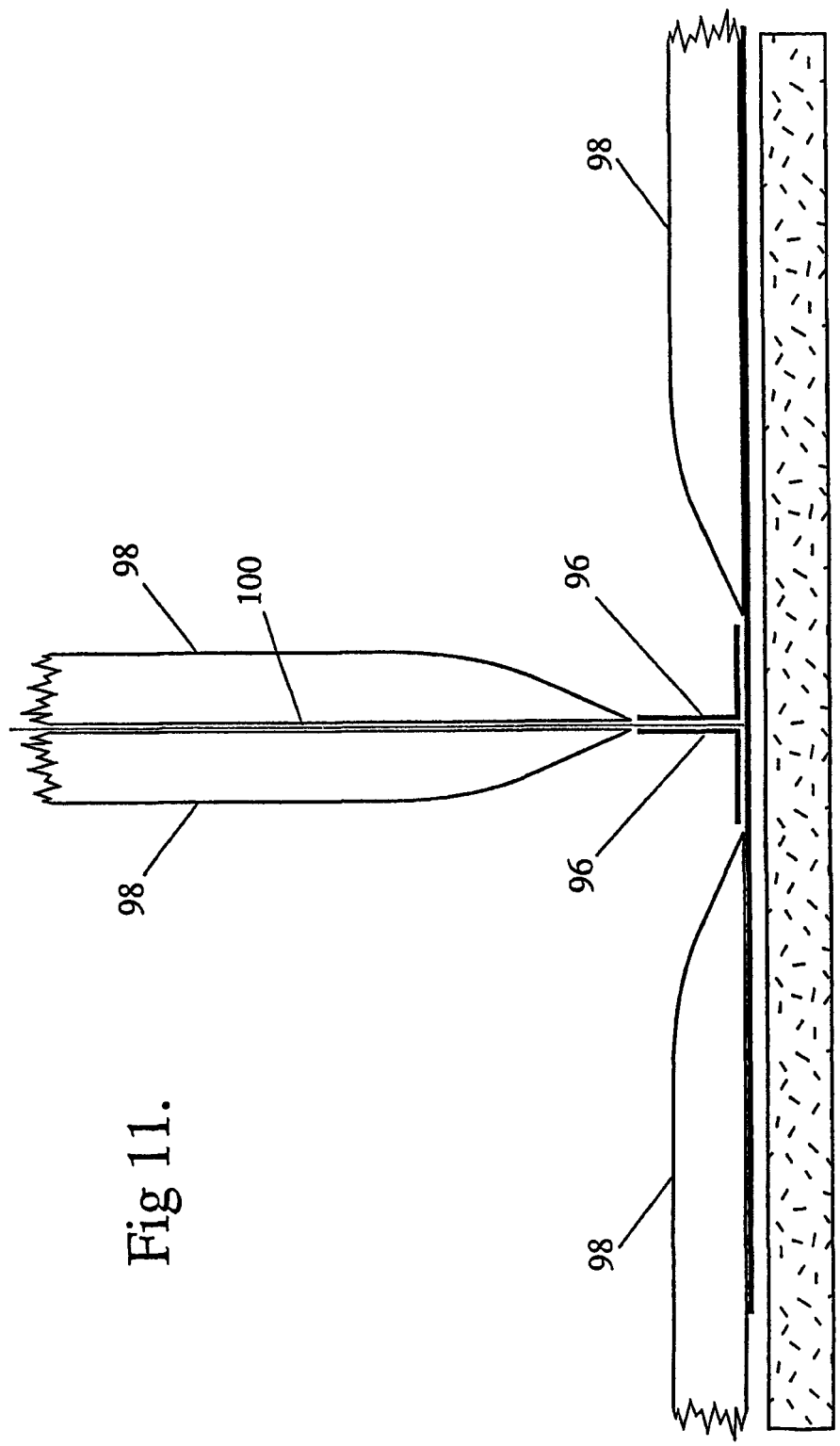
Figure 12:
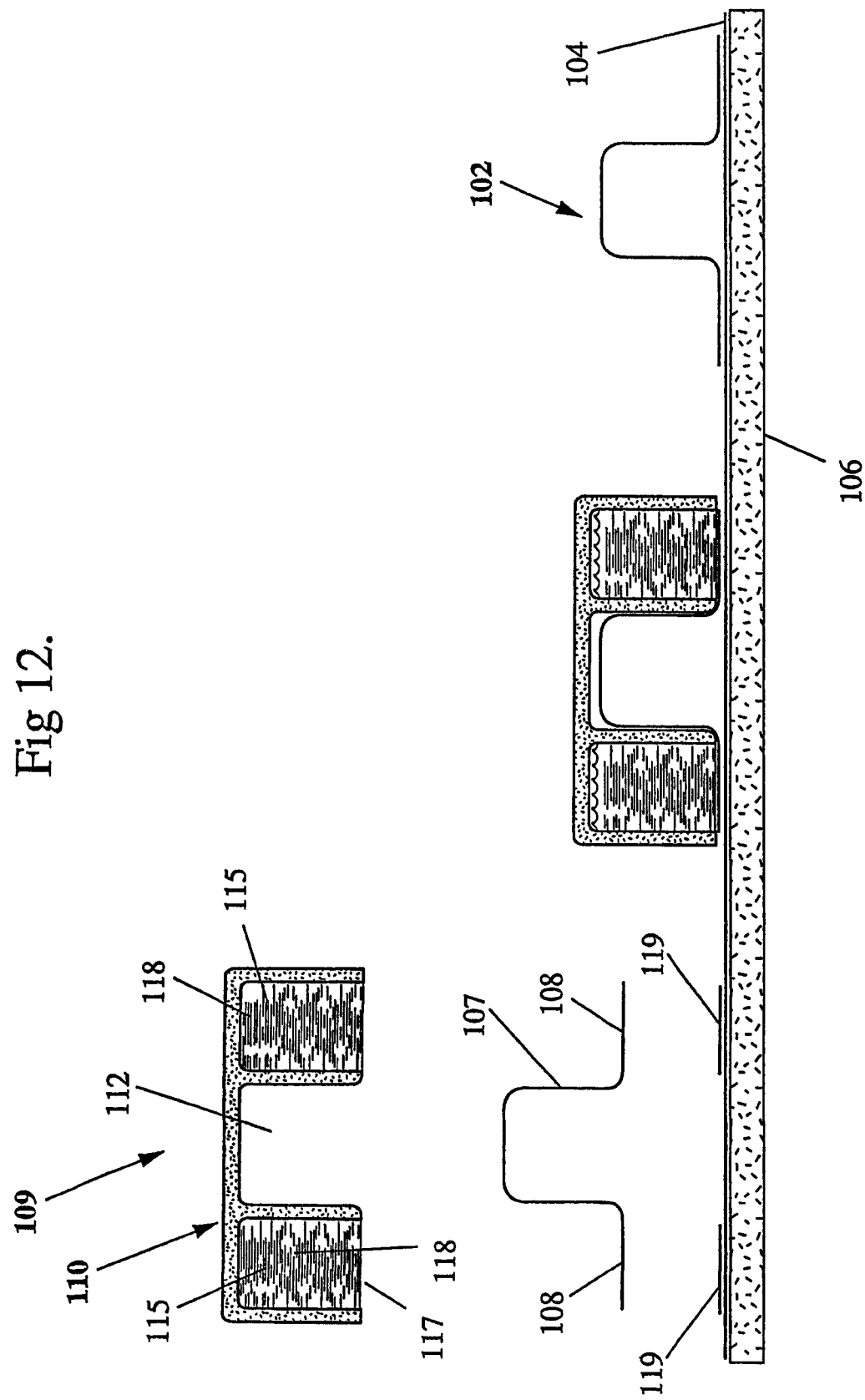
Figure 13:
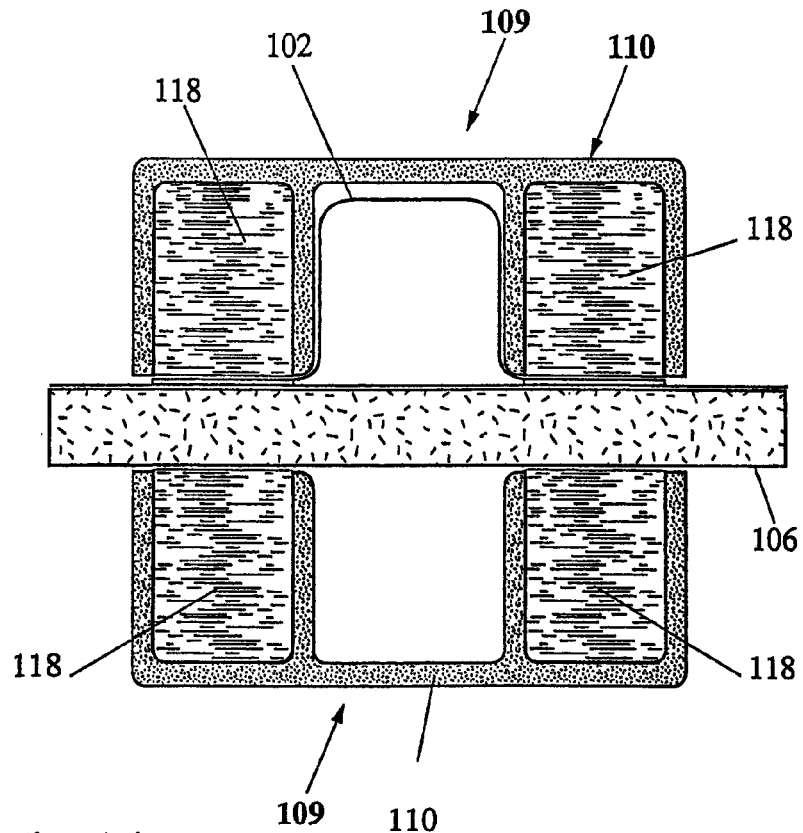
Figure 14:
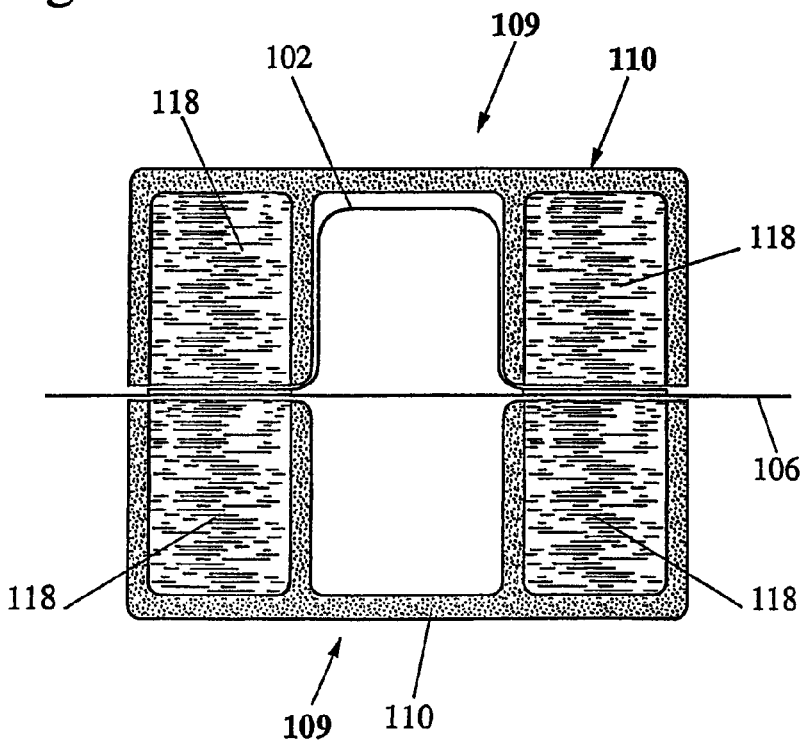
Figure 15:
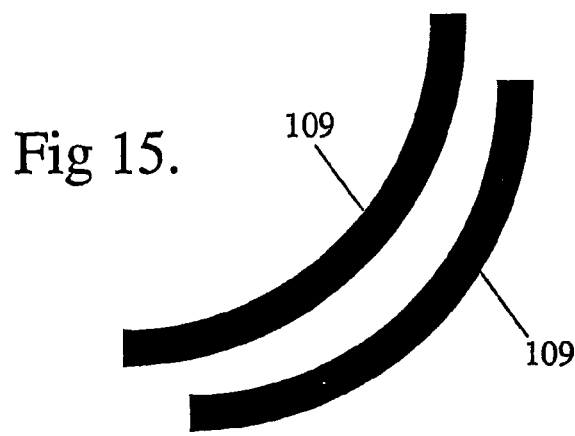
Figure 16:
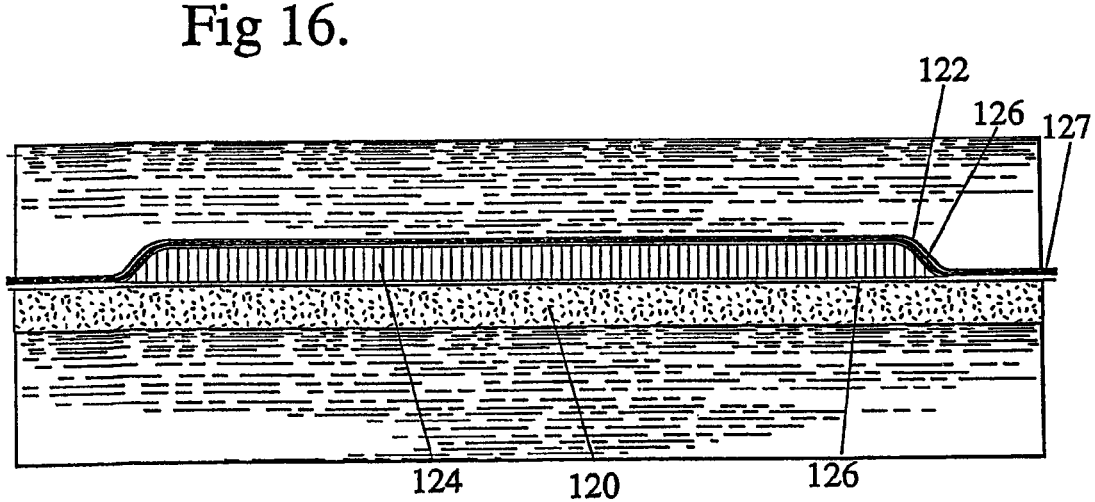
Figure 17:
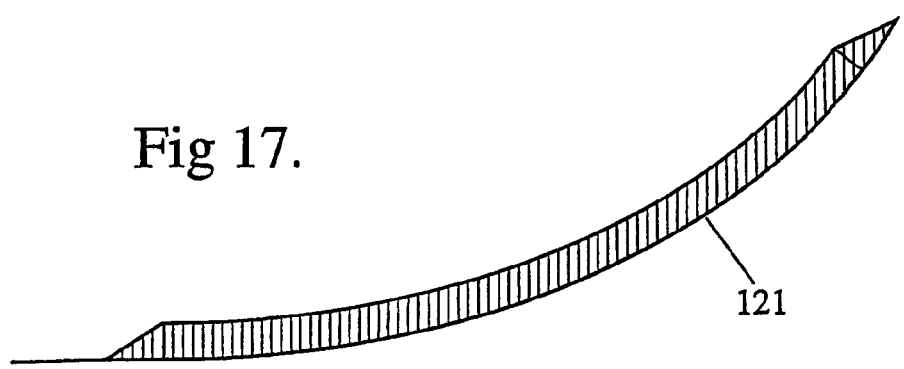
Figure 18:
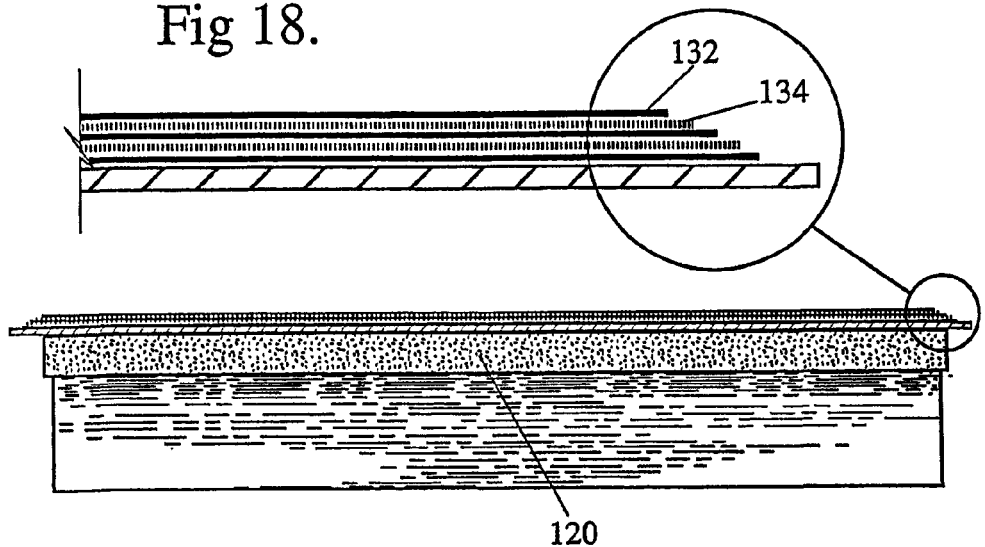
Figure 19:
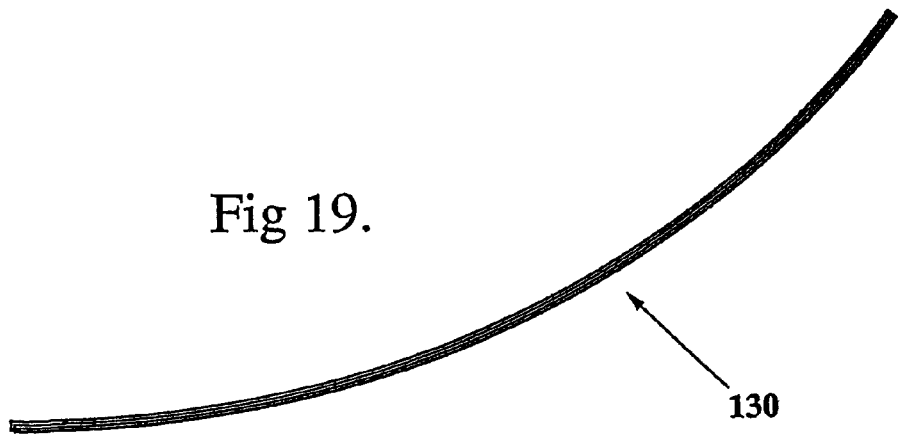
Figure 20:
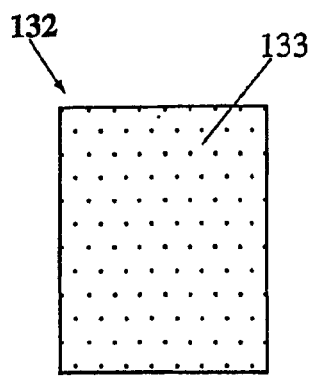
Figure 21:
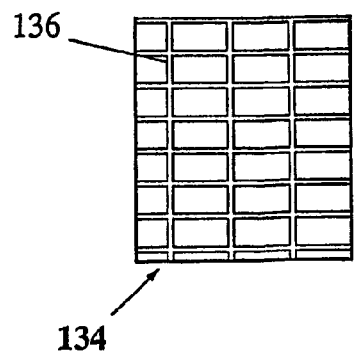

FIGS. 6a and b are schematic views showing the construction sequence of an aircraft wing according to the present invention;

FIG. 7 is a cross-sectional view of a lateral joint of composite panels using the method according to a fifth preferred embodiment of the present invention;

FIG. 8 is a cross-sectional view of the lateral joint of FIG. 7 when completed;

FIG. 9 is a cross-sectional view of a lateral joint of metal panels according to a sixth preferred embodiment of the present invention;

FIG. 10 is a cross-sectional view of the lateral joint of FIG. 9 when completed;

FIG. 11 is a cross-sectional view of a completed lateral joint for a closeout using the method and apparatus shown in FIG. 9;

FIG. 12 is a schematic cross-sectional view showing the bonding sequence of a top hat section to a metal panel according to a seventh preferred embodiment of the present invention;

FIG. 13 is a schematic cross-sectional view showing the bonding of a top hat section to a metal panel according to an eighth preferred embodiment of the present invention;

FIG. 14 is a schematic cross-sectional view showing the bonding of a top hat section to a metal panel according to a ninth preferred embodiment of the present invention;

FIG. 15 is a schematic side view of the apparatus shown in FIG. 14 used to bond a top hat section to a curved panel;

FIG. 16 is a schematic cross-sectional view of a tenth preferred embodiment of the present invention used to produce a metal composite panel having a metal honeycomb core;

FIG. 17 is a cross-sectional view of the panel produced by the method shown in FIG. 16;

FIG. 18 is a schematic cross-sectional view of an eleventh preferred embodiment of the present invention used to produce a metal composite panel formed of layers of metal sheeting; and FIG. 19 is a cross-sectional view of the panel produced by the method shown in FIG. 18;

FIG. 20 is a plan view of a perforated metal panel for the metal composite panel of FIGS. 18 and 19; and FIG. 21 is a plan view of an adhesive layer for the metal composite panel of FIGS. 18 and 19.

The composite component repair system, the composite component joining system, the metal component joining system and the metal composite panel production system all utilise the same common features. The following description therefore relates to all of these systems unless otherwise specified. It should also be noted that corresponding features in different embodiments of the invention are generally provided with the same reference numeral for clarity reasons.

Figure 1:
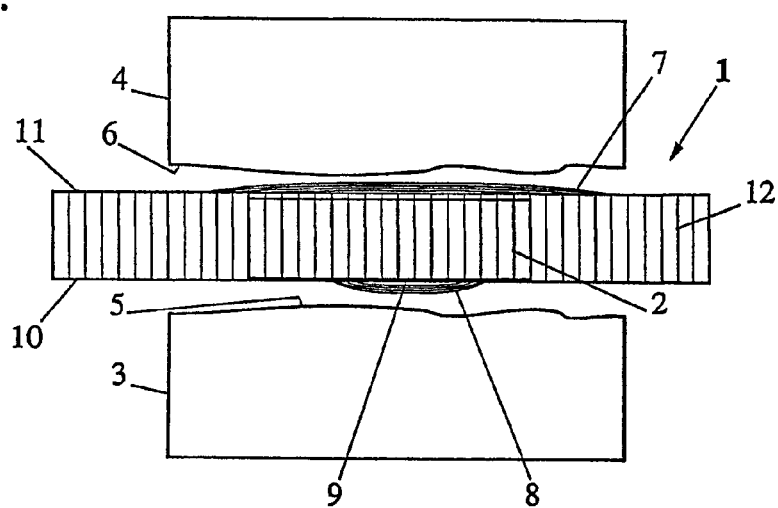
FIG. 1 is a schematic view showing a first preferred embodiment of the method according to the present invention used to repair a composite component.

Referring initially to FIG. 1, there is shown a partial cross-section of a composite component 1 having a damaged area 2 which is to be repaired. A first pressure chamber 3 is provided on one side of the damaged area 2, with a second pressure chamber 4 being located on the opposite side of the composite part 1 adjacent the damaged area 2.

It should be appreciated that where the present invention is used to join two composite or metal components 1, then the join area would be located between the first and second pressure chambers 3, 4. Therefore, the description of this and the following example embodiments of the invention are also applicable for the joining method. The first pressure chamber 3 includes a displaceable abutment face 5 in the form of a resiliently deformable membrane 5. This membrane may be made of rubber such as silicone or other high temperature plastics or materials. The second pressure chamber 4 similarly includes a displaceable abutment face 6 in the form of a resiliently formable membrane. A composite lay-up 7 formed of layers of laminate material impregnated with curing resin is located on one side of the composite component 1 to bridge the damaged area 2 (or the join area). This composite layer 7 acts as a "patch" for the repair. The damage in the form of a gap 9 provided in the skin 10 of the composite part is on the opposite side to the composite lay-up 7 providing the patch. A repair composite lay-up 8 is placed over the gap 9 prior to the repair process. This further composite lay-up 8 is also impregnated with curing resin. It should be noted that the composite component 1 is formed of a sandwich of two outer skins 10, 11 between which is provided a core of honeycomb material 12. The repair composite lay-up 8 includes sufficient material to both cover the gap 8 and fill any cavity provided within the core 12 of the composite component 1.

During operation of the method according to the present invention, the abutment faces 5, 6 of each pressure vessel 3, 4 are forced against the respective opposing sides of the damaged area 2. Fluid at an elevated temperature and pressure is then circulated through each pressure chamber 3, 4 to thereby compress the respective composite lay-ups 7, 8 and effect curing of the resin within each lay-up. A peel ply and breather cloth (not shown) can also be placed between the lay-ups 7, 8 to assist in the separation of the abutment face 6, 5 of each pressure vessel from the lay-up 7, 8 as well as to allow for the removal of excess curing resin therefrom.

Figure 2:
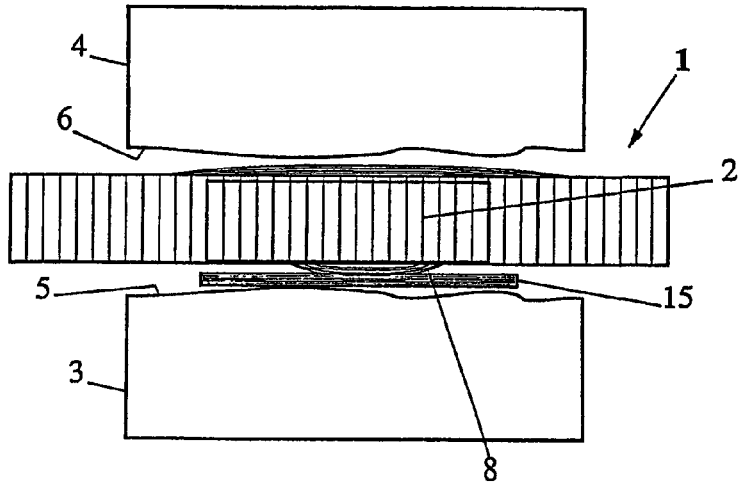
FIG. 2 is a schematic view showing a second preferred embodiment of the method according to the present invention used to repair a composite component.

FIG. 2 shows a similar arrangement to FIG. 1 except that a caul plate or accurate mould 15 is provided between the abutment face 5 of the first pressure chamber 3 and the repair composite lay-up 8. The caul plate 15 can be made of a relatively soft metal which can be preshaped into the desired form of the composite component 1 when repaired. The caul plate 15 will ensure that the surface 10 of the repaired composite component 1 has the desired shape when repaired. This is important where component surface 10 is required to be smooth when repaired, for example, in aircraft or boat applications and the pressure chamber can then work most effectively in compacting the part to the desired shape against the rigid mould. As the mould is or can be separate to the pressure vessel it can be positioned first accurately and rigidly to a framework to hold the part in accurate alignment before the heat and pressure is applied by the pressure vessels to cure the part. Thus this ensures the most accurate alignment possible of the mould the part and thus the cured component.

Figure 3:
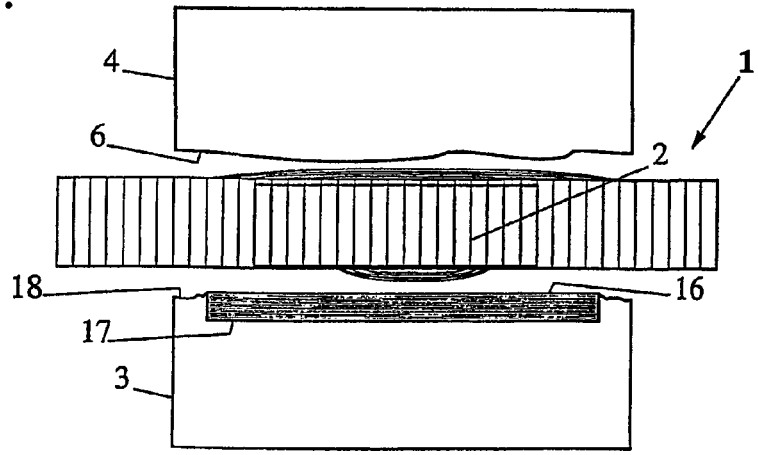
FIG. 3 is a schematic view showing a third preferred embodiment of the method according to the present invention used to repair a composite component.

FIG. 3 shows another possible embodiment of the present invention which is also similar to the arrangement shown in FIGS. 1 and 2. The principle difference is that the first pressure chamber 3 has an abutment face 15 in the form of a floating mould face 17 joined by a resiliently deformable flange 18 to the rest of the first pressure chamber 3. The floating mould face 17 is relatively rigid and acts in the same manner as the caul/mould plate 15 of FIG. 2 by ensuring that the repaired composite component 1 has a required profile and smoothness.

In all of the above arrangements, a cyclically varying pressure wave is provided in the fluid within both the first and second pressure chambers 3, 4 during the repair (or joining) procedure to facilitate the removal of air from the composite lay-ups 7,8. Furthermore, the use of two pressure chambers provide a balanced force on the composite component 1.

Figure 4:
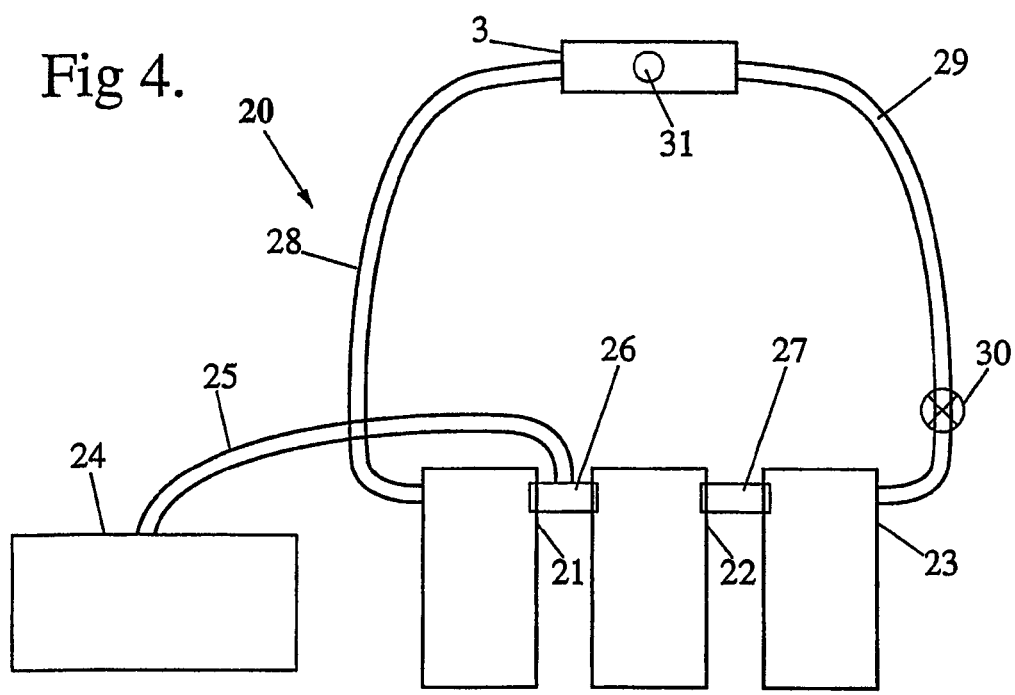
FIG. 4 is a schematic view showing the fluid circulation circuit for the apparatus according to the present invention.

FIG. 4 shows the various components of the fluid circulation system 20 of the first pressure chamber 3. It should also be noted that the fluid circulation system 20 is also connected to the second pressure chamber 4 even though this is not shown in FIG. 4.

This system 20 includes three fluid reservoirs 21, 22, 23 containing fluid at different temperatures. Therefore, fluid at the highest temperature is held in the first fluid reservoir 21, fluid at an intermediate temperature is held in the second fluid reservoir 22, while cold fluid 23 is contained in the third fluid reservoir 23. Each of the fluid reservoirs 21, 22, 23 are pressurised by compressed air from a compressed air source 24. The compressed air is delivered through a compressed air line 25 to a conduit 26 interconnecting the upper volumes of the first and second fluid reservoirs 21, 22. A similar conduit 27 interconnects the upper volume of the second and third fluid reservoirs 22, 23. The same air pressure is therefore applied to the fluid in each of the fluid reservoirs. A fluid supply line 28 supplies fluid to the pressure chamber 3, and a fluid return line 29 returns fluid from the pressure chamber 3 back to the fluid reservoirs. A fluid pump 30 is provided on the vacuum side of the pressure chamber 3.

A vibrator 31 is attached to the pressure chamber 3. This vibrator 31 induces cyclically varying pressure waves within the pressure chamber 3 to therefore place the composite lay-ups 7, 8 in a vibratory environment. This acts to facilitate the removal of air bubbles from between the layers of laminate in the composite lay-ups 7, 8. This may be further facilitated by a balance of vibration forces from top and bottom and or with balanced frequency so that the top and bottom vibrations occur at exactly the same moment and frequency and amplitude. If this approach is not followed then only one vibration source is practical and this should emanate from the flexible membrane side opposite the accurate surface to be created or formed.

Figure 5:
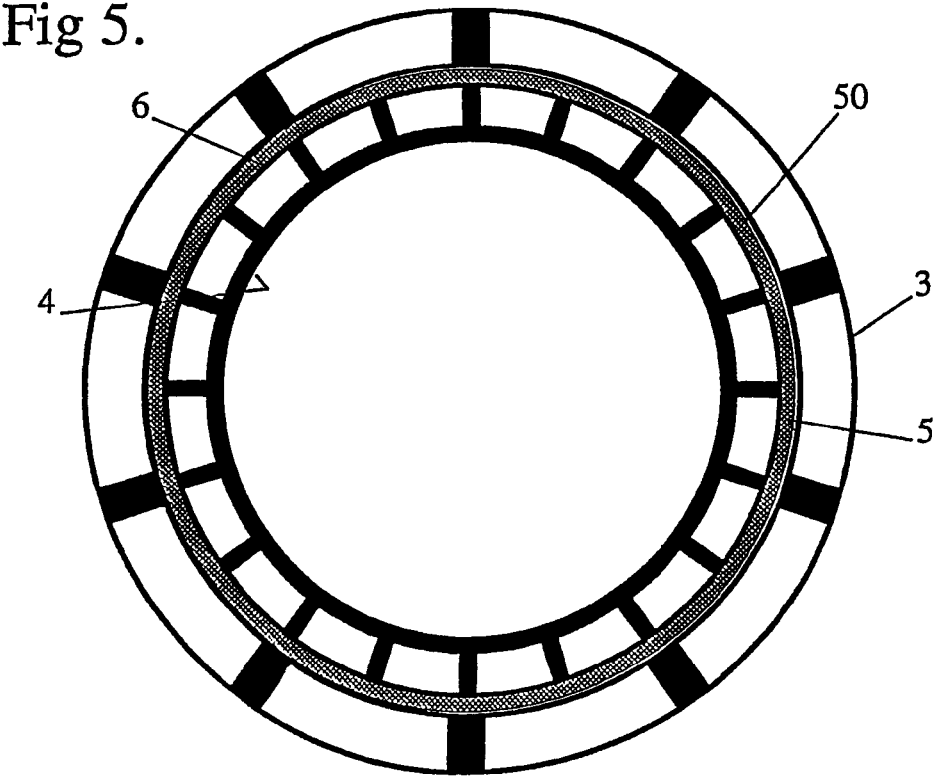
FIG. 5 is a schematic view of a preferred arrangement for joining fuselage sections of an aircraft according to a fourth example embodiment of the present invention.

FIG. 5 shows the present invention adapted for joining together fuselage sections 50 for an aircraft. These fuselage sections 50 may themselves be formed of a series of smaller composite panels joined by the method according to the present invention. Two fuselage sections 50, each having a circular cross-section are supported on a jig and are bought together to provide a join area therebetween. The first pressure chamber 3 is in the form of a segmented annular ring, with the abutment face 5 of the first pressure chamber 3 being located at the inner periphery thereof. The pressure chamber may also be comprised of a separate bag or inflatable bladder that can be positioned separately to the supporting framework. The first pressure chamber 3 totally encircles the fuselage sections 50. The second pressure chamber 4 is placed within the confines of the fuselage section 50. This second pressure chamber 4 is also in the form of an annular ring having an abutment face 6 provided on the outer periphery thereof. This fuselage joining arrangement otherwise operates in an identical fashion to the previously described repair and joining methods.

FIGS. 6a and b shows the construction sequence of an aircraft wing 52 according to the present invention. The wing 52 is constructed by initially laying a top wing skin 54 within a mould (not shown) defining the profile of the top wing skin 54. The top wing skin portion of the wing 52 is constructed first because of the higher loads applied to the top of the wing 52 during flight. Wing spars 55, 56 are joined to the top wing skin 54 using joins 60 produced by the method according to the present invention. This method will subsequently be described in more detail. The bottom wing skin 53 while preferably retained in the mould is then laid over the rest of the wing 52 and joined to the wing spars 55, 56 by further joins 62 produced according to the present invention. Join material 64 for producing the join 62 is then initially secured to opposing sides of the top of each wing spar 55, 56 prior to the bottom wing skin 53 being laid on top. Bladders 66, 68 are located in the hollow within the wing 52 for providing the pressure chambers according to the present invention. Heated pressurised fluid is circulated through the bladders 66, 68 to complete the bonding of the joins 60, 62 of the wing spars 55, 56 to the wing skins 52, 53. This may be accompanied by the pressurisation, at the same time and pressure of the fluid in the top and bottom moulds to minimise the distortion forces on the moulds. The bladders 66, 68 can be subsequently removed from the wing 52 through access holes after the joins have been formed.

The bladders 66, 68 can fill the entire volume within the wing 52 between the wing spars 55, 56 as shown in FIG. 66. It is however also envisaged that smaller bladders/tubes or other fluid chambers be used supported by a jig, within that volume. The jigs hold the fluid chamber adjacent the area to be joined. For example, elongate fluid chambers may be located by means of a jig located within the volume of the wing spar adjacent each of the joins 60, 62. The use of such an arrangement allows the fluid chambers to be readily removed from the wing 52 after use. The wing skin 52, 53 and wing spars 55, 56 can be made of composite material. FIG. 7 shows the method and apparatus for joining composite components in a lateral joint of the type shown in FIG. 6a and b. This joining method also has general industrial application and will therefore be described for such general applications.

FIG. 7 shows a composite panel 70 supported on a jig 72. Alternatively, it is possible to support the composite panel 70 on a floating mould of the type described in Australian Patent 697678. A second composite component 74 can be joined to the first composite panel 70 by applying a composite joint at each of the corners defined between the composite panels 70, 74.

The apparatus 75 according to the present invention includes an elongate housing 76 extending along the length of the joint, the housing 76 supports a resiliently deformable membrane 78 to thereby define a pressure chamber 80 therein. A similar pressure chamber 80 is provided on the opposite side of the panel 74 so that the pressures applied to the panel 74 are balanced during the curing of the joint. This ensures that there is no movement of the panel 74 while the pressure is being applied thereto. It is however to be appreciated that one of the pressure chambers 80 could be replaced by a jig located on the opposing side of the panel 74 to the other pressure chamber 80.

The composite joint 90 is prepared by initially applying a fillet of resin 82 in the corner to hold the lateral panel 74 in position. This resin fillet 82 also provides a curve upon which layers of resin wetted cloth or prepreg cloth 84 can be placed. This curve minimises the possibility of wrinkles being formed in the final composite joint. Over the prepreg cloth or sheets of dried fabric wetted with resin 84 is provided a peel ply or release cloth 86. Finally, a breather cloth 88 is provided over the release cloth. The purpose of the peel ply 86 and breather cloth 88 have been previously discussed and will not be repeated here. Once the pressure chambers 80 are located over the various layers, fluid at high temperatures and under pressure is passed through the pressure chambers 80 to thereby heat and compress the joint material. Furthermore, the pressure is cyclically varied within each pressure chamber. By having both pressure chambers 80 supplied from the same fluid source, this balances the pressures across the lateral panel 74 and there is no force acting to displace the panel 74.

The joint material can therefore be heated and cured by the apparatus according to the present invention.

The final composite joint 90 is shown in FIG. 8 which shows that joint 90 compacted against the corner provided between the composite panel 70, 74. The various layers of prepreg may be laid such that the composite joint 90 is thicker at the corner where the stresses are likely to be higher than at the peripheral edges of the joint 90 where there is less stress.

The method and apparatus according to the present invention can also be used to join metal components. The apparatus 75 used to join metal components is identical to the apparatus used to join composite components as shown in FIG. 7. The same reference numerals are therefore used for corresponding features. The main difference is the different materials used for providing a lateral joint between two metal panels 92, 94. The joint material includes a metal angle plate 96 with adhesive material being provided between the angle plate 96 and the metal panels 92, 94. A breather cloth 88 is provided over the metal angle plate 96 to enable the release of any air bubbles trapped in the adhesive material. The pressure chambers 80 act to bond the metal angle plate 96 to the panels 92, 94 to thereby complete the joint. The final joint is shown in FIG. 10 with the metal angle plate 96 being adhesively bonded to the panels 92, 94. This method of bonding the angle plate 96 is more energy efficient and less time consuming than conventional methods which would require the complete assembly to be located within an autoclave to cure the adhesive. The need to heat and subsequently cool the entire assembly can also lead to the potential of distortion in the joint or the metal component.

The method of forming a joint between metal components as shown in FIG. 9 can also be used to bond a closeout arrangement as shown in FIG. 11. Such arrangements are formed from honeycomb or other composite panels where the peripheral edge of the panel 98 is necked down to provide a thin section 100 about its periphery. A metal angle plate 96 can be applied to the join area between the peripheral edge 100 of the panels. It is to be appreciated that a composite joint as shown in FIG. 10 could also be used to join the panels.

Another form of construction used in the aircraft industry is metal panels reinforced with top hat and "T" or other sections. These sections are at present generally riveted to the metal panel. The manufacturing process requires elaborate jigs to hold the panels and sections in position while the holes are drilled and the rivets installed. This can be a very time consuming process. The present invention can however allow such top hat sections to be rapidly secured to a metal panel. FIG. 12 shows from left to right the various steps involved in securing a top hat section 102 to a metal panel 104. The metal panel 104 can be supported on a jig 106 or a floating mould of the type shown in Australian Patent 697678.

The top hat section 102 includes a central channel portion 106 and opposing peripheral flange portions 108. The apparatus 109 according to the present invention includes an elongate housing 110 having a centre channel portion 112 of a size sufficient to accommodate the centre channel portion 107 of the top hat section 106, and opposing side channels 115, each side channel supporting a resiliently deformable membrane 117. A pressure chamber 118 is therefore provided within each of the side channels 115.

An adhesive 119 is placed between the metal panel 114 and the flange portions 108 of the top hat section 102 as shown on the extreme left of FIG. 12. The top hat section 102 is placed against the metal panel 104 with the two pressure chambers 118 being respectively applied over the flange portions 108 thereof. The circulation of heated fluid under pressure cures the adhesive 119 such that the top hat section 102 can be bonded to the metal panel 104. Because no pressure is applied to the central channel portion 107 of the top hat section 102, there is no distortion of the top hat section 102 during the curing process.

The final secured top hat section 102 is shown on the extreme right of FIG. 12.

FIG. 13 shows a variation of the method shown in FIG. 12 where corresponding apparatus 109 are provided on opposing sides of the jig 106 to balance the pressure applied by the pressure chambers 118 on the flange portions of the top hat section 102.

FIG. 14 is a further variation of the method of FIG. 13 except that the jig 106 has been removed. This is because the opposing pressure chambers 118 provide a balance force on the metal panel 106 eliminating the need for a jig to support the metal panel. Furthermore, the housing 110 of the apparatus 109 can be curved to follow the general curvature and profile of the top hat section and thus form the metal panel 106 to the top hat section, when, for example, forming part of the fuselage of an aircraft. Opposing curved housings 110 can be provided on opposing sides of a metal panel so that, as well as acting like a jig by holding the metal panel in position, they enable the top hat section 102 to be secured thereto and thus form the metal panel to the top hat section. This arrangement, which is schematically shown in FIG. 15, eliminates the need for any elaborate jigs to hold the metal panel 104 in its required curved shape while the top hat sections 102 are being secured thereto.

It is also possible to use the present invention to produce metal composite panels. Referring to FIG. 16, the various components of the panel to be produced is located between two pressure chambers (not shown) according to the present invention. One of the pressure chambers includes a floating pressure plate 120, the other pressure chambers including a flexible bladder 122. The components of the panel to be constructed includes a central honeycomb panel core 124 located between two metal skins 126. The completed panel 121 is shown in FIG. 17. Adhesive material is sprayed or rolled on to the metal skin 126 and the method according to the present invention acts to bond the metal skin to the honeycomb core 124. A breather cloth 127 is also provided between the flexible bladder and one of the metal skins 126 to allow air to escape therefrom. Furthermore, the method according to the present invention can act to form the metal panel 121 into the required shape. For example, the panel 121 shown in FIG. 17 has been formed in to a complex curve. This is assisted by cyclically varying the pressure within the pressure chambers during the forming process. The metal skins 126 are provided with perforations to allow air to be released from within the core of the panel 121 during the forming process. The method according to the present invention can also neck together and bond the peripheral edges of the metal skin 126.

A similar procedure can be used to produce a composite panel 130 formed from layers of perforated metal sheeting 132 between which is provided adhesive layers 134. The metal panels may be perforated with multiple holes 133 as shown in FIG. 20. The adhesive layer may include pathways 136 for releasing air therefrom and be of firm or resilient construction at room temperature to ensure that air release occurs during compaction and forming of the metal panels. Once compaction and forming are complete the parts are heated and the adhesive melts to bond the skins together to form a panel. Also, a reinforcement material such as kevlar can also be included within the adhesive layer 134.

It is also possible to use the method and apparatus according to the present invention to provide for other manufacturing procedures such as the super plastic deformation of metals such as aluminium sheets. At temperatures of about 250 degrees Celcius, such material can be readily deformed. This can be achieved by locating a sheet to be deformed between opposing pressure chambers and circulating fluid at or above the above noted temperature while also providing a pressure wave effect or a cyclic pressure variation in the circulating fluid. It should be noted that different types of metals can be employed for various layers of the metal panel, for example, the outer skin may be thin titanium to resist corrosion and erosion and the inner layers may be lithium aluminium for light weight and ease of construction.

The invention claimed is:

1. A method of joining composite components, including:
   locating portions of two separate composite components in adjacent or overlapping relation, to thereby provide a join area therebetween, said composite components comprising thermocuring resin impregnated with fibrous reinforcing material;
   each said composite component being substantially fully cured, with each said portion located within the join area being uncured or partially cured;
   locating at least one pressure chamber over the join area, the pressure chamber including a displaceable abutment face;
   circulating fluid at an elevated temperature and pressure through the pressure chamber to thereby compress the join area with the displaceable abutment face of the pressure chamber and elevate the temperature thereof in a controlled manner over time to effect curing of the join area.

2. A method according to claim 1, including cyclically varying the pressure within the pressure chamber.

3. A method according to claim 1, wherein the displaceable abutment face is provided by a resiliently deformable membrane formed of a resiliently deformable sheet material.

4. A method according to claim 1, wherein the displaceable abutment face is provided by a separate flexible inflating bag.

5. A method according to claim 1, including locating a second pressure chamber having a displaceable abutment face at an opposing side of the join area.

6. A method according to claim 5, wherein the second chamber has fluid pressure and the fluid pressure in each pressure chamber is at least substantially identical.

7. A method according to claim 1, including locating the components to be joined in alignment using at least one fixed jig, the at least one pressure chamber being moveable for location over the join area.

8. A method according to claim 1, further comprising applying joining material including at least prepreg or curing resin to the join area.

9. A method of joining composite components, including:
   locating portions of two separate composite components in adjacent or overlapping relation, to thereby provide a join area therebetween, said composite components comprising thermocuring resin impregnated with fibrous reinforcing material, each said composite component being substantially fully cured with each said portion located within the join area being uncured or partially cured;
   locating at least one pressure chamber over the join area, the pressure chamber including a displaceable abutment face;
   circulating fluid at an elevated pressure through the pressure chamber to thereby compress the join area with the displaceable abutment face of the pressure chamber and controlling the temperature thereof by supplying the circulating fluid at different temperatures to the pressure chamber to effect curing and subsequent cooling of the join area.

10. A method according to claim 9 including applying joining material to the join area.

11. A method according to claim 9 wherein the circulating fluid is contained in a plurality of fluid reservoirs, each reservoir containing fluid at a different temperature, the method including supplying the circulating fluid from different reservoirs, to thereby allow for a rapid and controlled change in the temperature both up and down through the curing cycle of the fluid circulated through the pressure chamber.

12. A method of joining thermoplastic composite components, including:
   locating only portions of two separate thermoplastic composite components in adjacent or overlapping relation, to thereby provide a join area therebetween;
   locating at least one pressure chamber over the join area, the pressure chamber including a displaceable abutment face;
   circulating fluid to an elevated pressure through the pressure chamber to thereby melt compress and form the join area with the displaceable abutment face of the pressure chamber and controlling the temperature thereof by supplying the circulating fluid at different temperatures to the pressure chamber to effect melting and subsequent cooling of the join area.

13. A method according to claim 12 further comprising applying a joining material including at least one thermoplastic sheet to the join area.

14. A method according to claim 12 including cyclically varying the pressure with the pressure chamber.

* * * * *